United States Patent Office

3,823,005
Patented July 9, 1974

3,823,005
**N-(5-CHLORO-*TERT*.BUTYL - 2 - THIADIAZOLYL) CARBOXAMIDES AND USE TO COMBAT UNWANTED VEGETATION**
William C. Doyle, Jr., Leawood, and Joel L. Kirkpatrick, Overland Park, Kans., assignors to Gulf Research & Development Company, Pittsburgh, Pa.
No Drawing. Filed Oct. 4, 1971, Ser. No. 186,419
Int. Cl. A01n *9/12*
U.S. Cl. 71—90                         2 Claims

ABSTRACT OF THE DISCLOSURE

New N-(chloro-*tert*.butylthiadiazolyl) amides are employed to combat undesired vegetation both pre-emergently and post-emergently. Cyclopropanecarboxamides are preferred.

DESCRIPTION OF THE INVENTION

We have discovered a new class of herbicidal compounds which with some variation of the selectivity and activity are useful as herbicides to combat unwanted vegetation both pre- and post-emergently, particularly in the presence of crops such as peanuts and maize. According to the present invention, one may combat unwanted vegetation by applying to the locus of the vegetation a herbicidally effective amount of a compound having the structural formula:

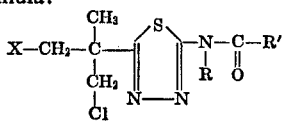

in which X represents hydrogen or a chloro substituent, R is hydrogen or a methyl or ethyl substituent and R' is selected from methyl, chloromethyl, ethyl, propyl, isopropyl, cyclopropyl, chloropropyl, and methoxymethyl substituents, preferably cyclopropyl. The novel compounds may be prepared from available starting materials according to procedures of the type specifically exemplified below.

Preparation of 2-amino-5-($\beta$-chloro-$\alpha,\alpha$-dimethylethyl)-1,3,4-thiadiazole To a well stirred suspension of 150 g. of thiocemicarbazide and 225 g. of $\beta$-chloropivolic acid in 500 ml. of dioxane heated at reflux temperature was added 262 g. of phosphorus oxychloride over a 1 hr. period. When the addition was complete, heating was continued until HCl evolution ceased. After cooling, the supernatant liquid was decanted from the solid mass and 500 ml. of water was added. With cooling, sodium hydroxide pellets were added until a pH of 10 was maintained. The resulting precipitate was collected, washed with water and air dried to give 266 g., m.p. 174–176° (85%). Recrystallization from methanol gave the analytical sample, m.p. 176–177°.

Anal. Calcd. for $C_6H_{10}ClN_3S$: C, 37.60; H, 5.26; N, 21.92. Found: C, 37.67; H, 5.47; N, 22.20.

Preparation of 2-methylamino-5-$\alpha,\alpha$-bis-chloromethyl-ethyl)-1,3,4-thiadiazole To a stirred suspension of 34 g. of 4-methylthiosemicarbazide in 150 ml. of dioxane was added 60 g. of bis-(2,2-chloromethyl)propionyl chloride, then heated to reflux temperature. Carefully, 50 g. of phosphorus oxychloride was added and heating continued until HCl evolution ceased. After cooling, the supernatant liquid was decanted from the viscous material that had separated, water was added and the mixture taken to a pH of 10 with sodium hydroxide pellets. No precipitate formed. The solution was extracted with CHCl$_3$ which was shaken with water, saturated sodium chloride and dried over Na$_2$SO$_4$. The CHCl$_3$ was removed at reduced pressure and the residue crystallized with a mixture of CH$_2$Cl$_2$-petroleum ether to give 27.8 g., m.p. 105–107° (36%). An analytical sample, m.p. 108–109°, was prepared from CH$_2$–Cl$_2$-petroleum ether.

Anal. Calcd. for $C_7H_{11}Cl_2N_3S$: C, 35.01; H, 4.62; N, 17.50. Found: C, 35.31; H, 4.80; N, 17.66.

Preparation of 2-isobutyrylamido-5-($\beta$-chloro-$\alpha,\alpha$-dimethylethyl)-1,3,4-thiadiazole To 6.0 g. of 2-amino-5-($\beta$-chloro-$\alpha,\alpha$-dimethylethyl)-1,3,4-thiadiazole in 25 ml. of pyridine, was added 6.0 g. of isobutyryl chloride at room temperature. The reaction was allowed to stir for 3 hours, then was poured into ice water. The resulting solid was collected, washed with water and air dried to give 6.5 g. m.p. 129–131° (81%). An analytical sample was prepared from CH$_2$Cl$_2$-petroleum ether, m.p. 132–133°.

Anal. Calcd. for $C_{10}H_{16}ClN_3OS$: C, 45.88; H, 6.16; N, 16.05. Found: C, 46.14; H, 6.20; N, 16.23.

TABLE I

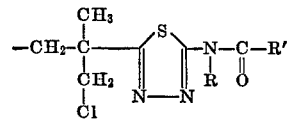

| X | R | R' | M.P., °C. | Calcd. C | Calcd. H | Calcd. N | Found C | Found H | Found N |
|---|---|---|---|---|---|---|---|---|---|
| H | H | Cyclopropyl | 137–138 | 46.24 | 5.43 | 16.18 | 46.03 | 5.43 | 16.03 |
| H | H | CH(CH$_3$)$_2$ | 132–133 | 45.88 | 6.16 | 16.05 | 46.14 | 6.20 | 16.23 |
| H | H | CH$_2$CH$_2$CH$_3$ | 134–136 | 45.88 | 6.16 | 16.05 | 45.06 | 6.04 | 16.21 |
| H | H | CH$_3$ | 214–215 | 41.11 | 5.17 | 17.98 | 40.90 | 5.11 | 17.76 |
| H | H | (CH$_2$)$_3$CL | 116–118 | 40.55 | 5.10 | 14.18 | 40.38 | 5.06 | 13.97 |
| H | H | —CH$_2$—C—CH$_3$ | 90–91 | 40.99 | 5.35 | 15.93 | 41.02 | 5.36 | 15.72 |
| H | CH$_3$ | CH(CH$_3$)$_2$ | 112–113 | 47.90 | 6.58 | 15.23 | 47.89 | 6.59 | 15.16 |
| H | CH$_3$ | C(CH$_3$)$_3$ | 104–105 | 49.73 | 6.95 | 14.50 | 49.51 | 6.99 | 14.37 |
| H | CH$_3$ | CH$_2$Cl | 84–85 | 38.31 | 4.64 | 14.89 | 38.31 | 4.70 | 14.93 |
| H | CH$_2$CH$_3$ | Cyclopropyl | 82–83 | 50.08 | 6.30 | 14.60 | 50.13 | 6.39 | 14.70 |
| Cl | H | Cycloproply | 156–157 | 40.83 | 4.45 | 14.28 | 40.86 | 4.39 | 14.07 |
| Cl | H | CH(CH$_3$)$_2$ | 176–177 | 40.55 | 5.10 | 14.18 | 40.80 | 5.06 | 14.18 |
| Cl | H | CH$_2$CH$_3$ | 145–146 | 38.31 | 4.64 | 14.89 | 38.39 | 4.81 | 14.57 |
| Cl | CH$_3$· | Cyclopropyl | 104–105 | 42.86 | 4.90 | 13.63 | 43.04 | 5.02 | 13.80 |
| Cl | CH$_3$ | CH$_3$ | 120–121 | 38.31 | 4.64 | 14.89 | 38.29 | 4.75 | 14.93 |
| Cl | CH$_3$ | CH$_2$CH$_3$ | 100–101 | 40.55 | 5.10 | 14.18 | 40.56 | 5.22 | 14.23 |
| Cl | CH$_2$CH$_3$ | Cyclopropyl | 101–102 | 44.73 | 5.32 | 13.04 | 44.86 | 5.22 | 13.18 |
| Cl | CH$_2$CH$_3$ | CH$_2$CH$_3$ | 139–140 | 42.59 | 5.52 | 13.54 | 42.68 | 5.50 | 13.55 |

Combating Unwanted Vegetation

The novel herbicides are effective when used both post- and pre-emergently. There is described below an illustrative procedure for herbicidal use of the compounds under controlled conditions in the greenhouse so as to obtain data on phytotoxic activity and selectivity.

(1) Post-Emergent Use

An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in a greenhouse. Ten to eighteen days after emergence of the plants, three pots of each species were sprayed with an aqueous dispersion of the active compound prepared as described above, at a rate of 5 lb. of active compound per acre and at a spray volume of 60 gallons per acre. Approximately one week after the spray application the plants were observed and the results rated according to the following schedule.

DEGREE OF EFFECT

0 = no effect
1 = slight effect
2 = moderate effect
3 = severe effect
4 = maximum effect (all plants died)

The same rating schedule was employed to judge pre-emergent results obtained according to the procedure below.

(2) Pre-Emergent Use

A solution of each active compound was prepared by dissolving 290 mg. of the compound to be tested in 200 ml. of acetone. Disposable expanded polystyrene trays about 2½ inches deep and about one square foot in area were prepared and sprayed with the acetone solution at the rate of 10 lb. of active chemical per acre of sprayed area and were then covered with about ¼ inch of soil. Twenty-one days after seeding and treatment the plants were examined and herbicidal effect was rated according to the above schedule.

Both post-emergent and pre-emergent results are set forth in the following table.

TABLE II

Use of herbicides having the structural formula:

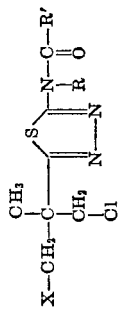

| X | R | R' | Type | Crab-grass | Coxcomb | Brome | Millet | Soybean | Cotton | Alfalfa | Oats | Corn | Flax | Radish | Sugar beet | Wheat | Grain sorghum | Tomato |
|---|---|---|---|---|---|---|---|---|---|---|---|---|---|---|---|---|---|---|
| H | H | Cyclopropyl | Post | 4 | 4 | 4 | 4 | | | 4 | 4 | 3 | 4 | 4 | 4 | | | 4 |
|   |   |             | Pre  |   |   |   | 4 |   |   | 4 | 4 |   |   | 4 | 4 |   |   |   |
| H | H | C₂H₅ | Post | 3 | 4 | 4 | 4 | 4 | 4 | 4 | 4 |   |   | 4 | 4 |   |   | 4 |
|   |   |      | Pre  |   |   |   |   |   |   |   |   |   |   |   |   |   |   |   |
| H | H | CH₃-CH-CH₃ | Post | 3 | | | 4 | | | 4 | 4 | | | 4 | 4 | | | 4 |
|   |   |            | Pre  |   |   |   |   |   |   |   |   |   |   |   |   |   |   |   |
| H | H | -CH₂-CH₂-CH₃ | Post | 2 | 4 | 1 | 3 | | | | 2 | | | 4 | 4 | | | 4 |
|   |   |              | Pre  |   |   |   | 3 |   |   | 4 |   |   |   | 4 | 4 |   |   |   |
| H | H | -CH₃ | Post | 2 | 4 | 1 | 1 | | | 4 | 1 | | | 3 | 3 | | | 4 |
|   |   |      | Pre  |   |   |   | 2 |   |   |   |   |   |   | 3 | 3 |   |   | 3 |
| H | H | -CH₂-CH₂-CH₂-Cl | Post | 2 | 4 | 1 | 2 | | | 4 | 1 | | | 4 | 4 | | | 4 |
|   |   |                 | Pre  |   |   |   | 3 |   |   |   |   |   |   |   |   |   |   |   |
| H | H | -CH₂-O-CH₃ | Post | 1 | 4 | 1 | 4 | | | 4 | 2 | | | 4 | 4 | | | 4 |
|   |   |            | Pre  |   |   |   | 1 |   |   |   |   |   |   | 3 | 2 |   |   |   |
| H | -CH₃ | CH₃-CH-CH₃ | Post | 4 | 4 | 4 | 4 | | | 4 | 3 | | | 4 | 4 | | | 4 |
|   |      |            | Pre  |   |   |   | 4 |   |   |   |   |   |   | 4 | 4 |   |   |   |

| X | R | R' | | | | |
|---|---|---|---|---|---|---|
| H | —CH₃ | —C(CH₃)₃ | Post | | | 3 |
| | | | Pre | 2 | | 1 |
| H | —CH₃ | —CH₂—Cl | Post | 2 | 4 | 1 |
| | | | Pre | 1 | 4 | 0 |
| H | —CH₃ | Cyclopropyl | Post | 4 | 4 | 4 |
| | | | Pre | 2 | 4 | 3 |
| H | H | Cyclopropyl | Post | 2 | 4 | 4 |
| | | | Pre | 4 | 4 | 4 |
| Cl | H | —CH(CH₃)CH₃ | Post | | | 4 |
| | | | Pre | 2 | 4 | 2 |
| Cl | H | C₂H₅ | Post | 4 | 4 | 4 |
| | | | Pre | 4 | 4 | 4 |
| Cl | CH₃ | Cyclopropyl | Post | 4 | 4 | 4 |
| | | | Pre | 4 | 4 | 4 |
| Cl | CH₃ | —CH₃ | Post | 4 | 4 | 4 |
| | | | Pre | 1 | 3 | 1 |
| Cl | CH₃ | C₂H₅ | Post | 3 | 4 | 3 |
| | | | Pre | 4 | 4 | 4 |
| Cl | C₂H₅ | Cyclopropyl | Post | 4 | 4 | 4 |
| | | | Pre | 3 | 4 | 3 |
| Cl | C₂H₅ | C₂H₅ | Post | 3 | 3 | 3 |
| | | | Pre | 3 | 3 | 3 |

Other compounds of closely related structure were also tested by the procedure described above, with results which indicate that small differences in structure may have critical effects on phytotoxicity. For example, no useful herbicidal activity was observed in compounds having the structural formula:

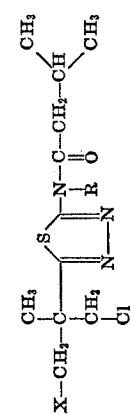

The preferred herbicide for use in combating unwanted vegetation according to the method of this invention is the compound having the structural formula:

In a further test carried out in a manner similar to the procedure described above, this compound was compared with two other similar compounds on twenty-four species of plants. Results were scored according to the same rating schedule as above and appear below in Table III.

TABLE III
Use of Herbicides on twenty-four species

| | Compound No. 1 | | | | Compound No. 2 | | | | Compound No. 3 | | | |
|---|---|---|---|---|---|---|---|---|---|---|---|---|
| | Pre | | Post | | Pre | | Post | | Pre | | Post | |
| Plant species | 3 lb./a. | 1 lb./a. | 3 lb./a. | 1 lb./a. | 3 lb./a. | 1 lb./a. | 3 lb./a. | 1 lb./a. | 3 lb./a. | 1 lb./a. | 3 lb./a. | 1 lb./a. |
| Cocklebur | 3 | 2 | 4 | 4 | 2 | 1 | 4 | 4 | 1 | 0 | 4 | 4 |
| Lambsquarter | 4 | 4 | 4 | 4 | 4 | 4 | 4 | 3 | 4 | 4 | 4 | 3 |
| Morning glory | 4 | 4 | 4 | 4 | 4 | 4 | 4 | 4 | 2 | 1 | 4 | 3 |
| Pigweed | 4 | 3 | 4 | 4 | 4 | 1 | 4 | 4 | 4 | 4 | 4 | 3 |
| Wild buckwheat | 4 | 3 | 3 | 3 | 4 | 1 | 3 | 3 | 4 | 4 | 4 | 3 |
| Wild mustard | 4 | 0 | 4 | 3 | 3 | 1 | 3 | 3 | 3 | 3 | 4 | 3 |
| Barnyard grass | 1 | 0 | 3 | 3 | 1 | 0 | 1 | 3 | 3 | 3 | 4 | 3 |
| Crabgrass | 4 | 3 | 4 | 3 | 2 | 2 | 3 | 3 | 3 | 3 | 4 | 4 |
| Downy brome | 4 | 0 | 4 | 0 | 0 | 0 | 0 | 2 | 4 | 0 | 4 | 0 |
| Giant foxtail | 0 | 2 | 4 | 4 | 2 | 2 | 4 | 3 | 4 | 4 | 4 | 4 |
| Green foxtail | 4 | 0 | 2 | 2 | 0 | 0 | 2 | 2 | 4 | 0 | 4 | 0 |
| Nutsedge | 3 | 0 | 0 | 0 | 0 | 0 | 0 | 0 | 0 | 0 | 0 | 0 |
| Shattercane | 2 | 1 | 4 | 4 | 2 | 0 | 2 | 2 | 4 | 1 | 4 | 3 |
| Wild oats | 0 | 0 | 2 | 2 | 0 | 0 | 0 | 0 | 2 | 0 | 2 | 1 |
| Alfalfa | 4 | 4 | 4 | 4 | 4 | 4 | 4 | 4 | 4 | 4 | 4 | 4 |
| Cotton | 1 | 1 | 1 | 1 | 1 | 0 | 1 | 1 | 2 | 1 | 1 | 1 |
| Peanut | 2 | 2 | 2 | 2 | 2 | 0 | 0 | 0 | 1 | 0 | 0 | 1 |
| Soybean | 3 | 3 | 3 | 3 | 3 | 1 | 1 | 2 | 4 | 3 | 4 | 4 |
| Sugar beets | 4 | 4 | 4 | 4 | 4 | 0 | 4 | 4 | 4 | 4 | 4 | 3 |
| Tomato | 4 | 2 | 4 | 4 | 2 | 1 | 2 | 1 | 3 | 1 | 4 | 1 |
| Corn | 1 | 0 | 1 | 1 | 0 | 0 | 1 | 0 | 1 | 0 | 0 | 1 |
| Grain sorghum | 2 | 2 | 3 | 2 | 2 | 0 | 2 | 2 | 3 | 3 | 3 | 3 |
| Rice | 4 | 2 | 4 | 3 | 3 | 1 | 4 | 4 | 4 | 0 | 4 | 0 |
| Wheat | 3 | 0 | 3 | 3 | 2 | 2 | 2 | 2 | 2 | 1 | 3 | 2 |

We claim:
1. Combating unwanted vegetation by applying to the locus of the vegetation a herbicidally effective amount of a compound having the structural formula

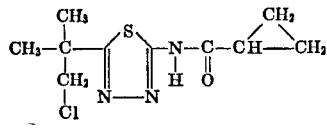

2. Combating unwanted vegetation by applying to the locus of the vegetation a herbicidally effective amount of a compound having the structural formula

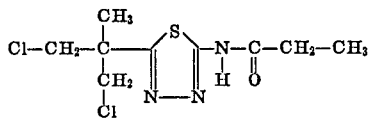

References Cited

UNITED STATES PATENTS 3,429,688   2/1969   Duerr et al. _____ 71—90
3,306,727   2/1967   Neighbors _____ 71—90

JAMES O. THOMAS, JR., Primary Examiner

U.S. Cl. X.R.

260—306.8 D

PO-1050
(5/69)

UNITED STATES PATENT OFFICE
CERTIFICATE OF CORRECTION

Patent No. 3,823,005      Dated July 9, 1974

Inventor(s) William C. Doyle, Jr. and Joel L. Kirkpatrick

It is certified that error appears in the above-identified patent and that said Letters Patent are hereby corrected as shown below:

Column 1, line 27, the word "thiocemicarb-" should read - - - thiosemicarb- - - -

Table 1, line 5, under the heading R' "$(CH_2)_3CL$" should read - - - $(CH_2)_3Cl$ - - -

Signed and sealed this 3rd day of December 1974.

(SEAL)
Attest:

McCOY M. GIBSON JR.
Attesting Officer

C. MARSHALL DANN
Commissioner of Patents